US012368036B2

(12) United States Patent
Ngo et al.

(10) Patent No.: US 12,368,036 B2
(45) Date of Patent: Jul. 22, 2025

(54) HOLDER FOR A CAPILLARY TRIGGERED TO HOLD WHEN A CAPILLARY IS INSERTED

(71) Applicant: Micromass UK Ltd, Wilmslow (GB)

(72) Inventors: Pham Hoang Vu Ngo, Singapore (SG); Arvind Rangan, Singapore (SG); Veronica Lum, Singapore (SG); Carl Chen, Singapore (SG); Nicola Lumley, Wilmslow (GB); David Douce, Wilmslow (GB)

(73) Assignee: Micromass UK Limited, Wilmslow (GB)

( * ) Notice: Subject to any disclaimer, the term of this patent is extended or adjusted under 35 U.S.C. 154(b) by 303 days.

(21) Appl. No.: 17/998,000

(22) PCT Filed: May 5, 2021

(86) PCT No.: PCT/GB2021/051075
§ 371 (c)(1),
(2) Date: Nov. 4, 2022

(87) PCT Pub. No.: WO2021/224609
PCT Pub. Date: Nov. 11, 2021

(65) Prior Publication Data

US 2023/0178351 A1 Jun. 8, 2023

(30) Foreign Application Priority Data

May 5, 2020 (SG) ............................ 10202004141T

(51) Int. Cl.
*H01J 49/04* (2006.01)

(52) U.S. Cl.
CPC ................................ *H01J 49/0404* (2013.01)

(58) Field of Classification Search
CPC .......................... H01J 49/0404; H01J 49/0409
See application file for complete search history.

(56) References Cited

U.S. PATENT DOCUMENTS

| | | | | |
|---|---|---|---|---|
| 2011/0180706 A1 | 7/2011 | O'Malley | | |
| 2014/0375050 A1* | 12/2014 | Zeko | G01N 30/6004 | 285/317 |

FOREIGN PATENT DOCUMENTS

| | | |
|---|---|---|
| EP | 3170460 A1 | 5/2017 |
| GB | 2366448 A | 3/2002 |
| WO | 2019091993 A1 | 5/2019 |

OTHER PUBLICATIONS

Combined Search and Examination Report for GB Patent Application No. GB2020543.1, mailed Apr. 29, 2021.

(Continued)

*Primary Examiner* — Timothy P Graves
(74) *Attorney, Agent, or Firm* — Goodwin Procter LLP

(57) ABSTRACT

A holder for a capillary, comprising: a housing having a passage to receive a capillary; and a clamping mechanism configurable between: an engaged state in which the clamping mechanism is configured to retain a capillary receivable in the passage in use; and a disengaged state in which the clamping mechanism is configured to allow insertion/removal of a capillary in the passage in use; and a release mechanism operatively associated with the clamping mechanism and movable between a first position, in which the clamping mechanism is configured in said engaged state; and a second position, in which the clamping mechanism is configured in aid disengaged state, wherein the release mechanism is configured to bias the clamping mechanism towards the engaged state, wherein the passage in the housing comprises an end stop, configured to abut the end of a capillary inserted in the passage in use.

14 Claims, 8 Drawing Sheets

(56) References Cited

OTHER PUBLICATIONS

International Search Report and Written Opinion for International Patent Application No. PCT/GB2021/051075, mailed Sep. 27, 2021.
Waters Corp, "Waters Gives More Laboratories Access to Mass Spectrometry with Rapid, Easy, and Compact RADIAN ASAP System", waters.com, https :/ /ir. waters. com/newsroom/press-release-details/2020/W aters-Gives- More-Laboratories-Access-to-Mass-Spectrometry-with-Rapid-Easy-and-Compact-RADIAN-ASAP-System/default.aspx, Nov. 2, 2020.
Waters Corp, "RADIAN ASAP—Sample Introduction", waters.com, https://videos. waters. com/ detail/video/621309164000 I/radian-asap---sample-introduction, Dec. 7, 2020.
ICC, "Spring Clip Audio Speaker Connectors", ice.com, https://icc.com/product/spring-clip-audio-speaker-connectors/, [Accessed Apr. 22, 2021].
Amazon, ". . . Spring Wire Connectors . . . ", amazon.co.uk, https ://www.amazon.co. uk/D WE-Connectors-Electrical-Connector-Connecting/dp/B07 6Q5RL4J, [ accessed Apr. 22, 2021].

* cited by examiner

HOLDER FOR A CAPILLARY TRIGGERED TO HOLD WHEN A CAPILLARY IS INSERTED

CROSS-REFERENCE TO RELATED APPLICATIONS

This application is a U.S. national phase filing claiming the benefit of and priority to International Patent Application No. PCT/GB2021/051075, filed May 5, 2021, which claims priority from and the benefit of Singapore patent application Ser. No. 10/202,004141T, filed May 5, 2020. The entire contents of these applications are incorporated herein by reference.

The present invention relates to a holder for a capillary and a method of using the same.

BACKGROUND OF THE INVENTION

The invention generally relates to an atmospheric solids analysis probe (ASAP). Such probes, and the associated instrument for use with ASAP, are provided by several manufacturers, including Waters Corporation, Milford, MA, U.S.A.

ASAP is a useful and relatively cheap tool for use in the direct analysis of volatile and semi-volatile, solid and liquid samples and may be used in the analysis of specialty chemicals, synthetic polymers, energy sources and food.

A sample is introduced into an ion source housing (e.g. an API source), in which the sample is volatilised using a heated gas, such as nitrogen, and the sample is then ionised using, for example, a corona discharge pin. The ionised sample may subsequently be analysed in a mass spectrometer.

The sample is introduced into the source by loading it onto the tip of a capillary. The capillary may comprise a conventional glass capillary. The capillary may be a solid rod, or a tube, with open ends.

Capillaries are fragile and susceptible to contamination. To ensure reliable and accurate analysis, the tip of the capillary must be inserted into the source in a repeatable manner.

To assist in the loading of a capillary into a source, it is known to provide a holder comprising a clamp mechanism which serves to retain the proximal end of the capillary (opposite the tip at the distal end which carries a sample) in the capillary holder. This may provide a user with a more robust method of handling the capillary, and may also assist in the guiding of the capillary into the source. The capillary holder, and/or the source instrument, may comprise a guide mechanism to ensure the correct alignment of the capillary as it is loaded into the source.

The present invention seeks to provide an improved holder for a capillary.

Accordingly, the present invention provides a holder for a capillary, comprising:

- a housing having a passage to receive a capillary;
- a clamping mechanism configurable between:
  - an engaged state in which the clamping mechanism is configured to retain a capillary receivable in the passage in use; and
  - a disengaged state in which the clamping mechanism is configured to allow insertion/removal of a capillary in the passage in use; and
- a trigger operatively associated with the clamping mechanism, configured to change the clamping mechanism from said disengaged state to said engaged state by inserting a capillary into the passage.

In at least one embodiment, the trigger is configured to change the clamping mechanism from said disengaged state to said engaged state by engaging the capillary with the trigger.

In at least one embodiment, the holder further comprises a release mechanism operatively associated with the clamping mechanism, configured to change the clamping mechanism from said engaged state to said disengaged state upon a user operating the release mechanism.

In at least one embodiment, the holder is configured to eject a capillary retained in the passage as the release mechanism changes the clamping mechanism to said disengaged state.

In at least one embodiment, the release mechanism is movable between a first position, in which the clamping mechanism is configured in said engaged state; and a second position, in which the clamping mechanism is configured in said disengaged state.

In at least one embodiment, the release mechanism is biased towards the first position.

In at least one embodiment, the release mechanism comprises a carriage translatably received in the housing, the trigger comprises a plunger arranged in the carriage and configured to protrude from the carriage and be received in the passage when the carriage is in the second position, and be retained in the carriage when the carriage is in the first position.

In at least one embodiment, the plunger is biased to protrude from the carriage.

In at least one embodiment, the clamping mechanism comprises:

- a clamping arm, pivotably mounted at a first end to the housing and pivotably mounted at a second end to the release mechanism; and
- a clamping element mounted to the clamping arm between the first and second ends.

In at least one embodiment, the clamping element is pivotably mounted to the clamping arm.

In at least one embodiment, the clamping element comprises a capillary-engaging tooth at each of the first and second ends of the clamping element.

In at least one embodiment, the clamping element comprises a leaf spring.

In at least one embodiment, the passage is at least partially defined by a bore of the housing.

In at least one embodiment, the holder further comprises a capillary, wherein the clamping mechanism is configured in said engaged state such that at least a portion of the capillary is substantially retained in the passage.

The present invention further provides a method of retaining a capillary in a holder, the holder comprising a housing having a passage; a clamping mechanism configured in a disengaged state; and a trigger operatively associated with the clamping mechanism, the method comprising:

- inserting a capillary into the passage;
- using the trigger to change the clamping mechanism from said disengaged state to an engaged state to retain the capillary in the passage.

The present invention further provides a method of ejecting a capillary from a holder, the holder comprising: a housing having a passage in which a capillary is received; a clamping mechanism configured in an engaged state so as to retain the capillary received in the passage; and a trigger operatively associated with the clamping mechanism, the method comprising:

changing the clamping mechanism from said engaged state to a disengaged state to allow removal of the capillary from the passage.

In at least one embodiment, the method further comprises ejecting the capillary from the passage.

Embodiments of the present invention will now be described, by way of non-limiting example only, with reference to the following figures in which.

Figure 7A:
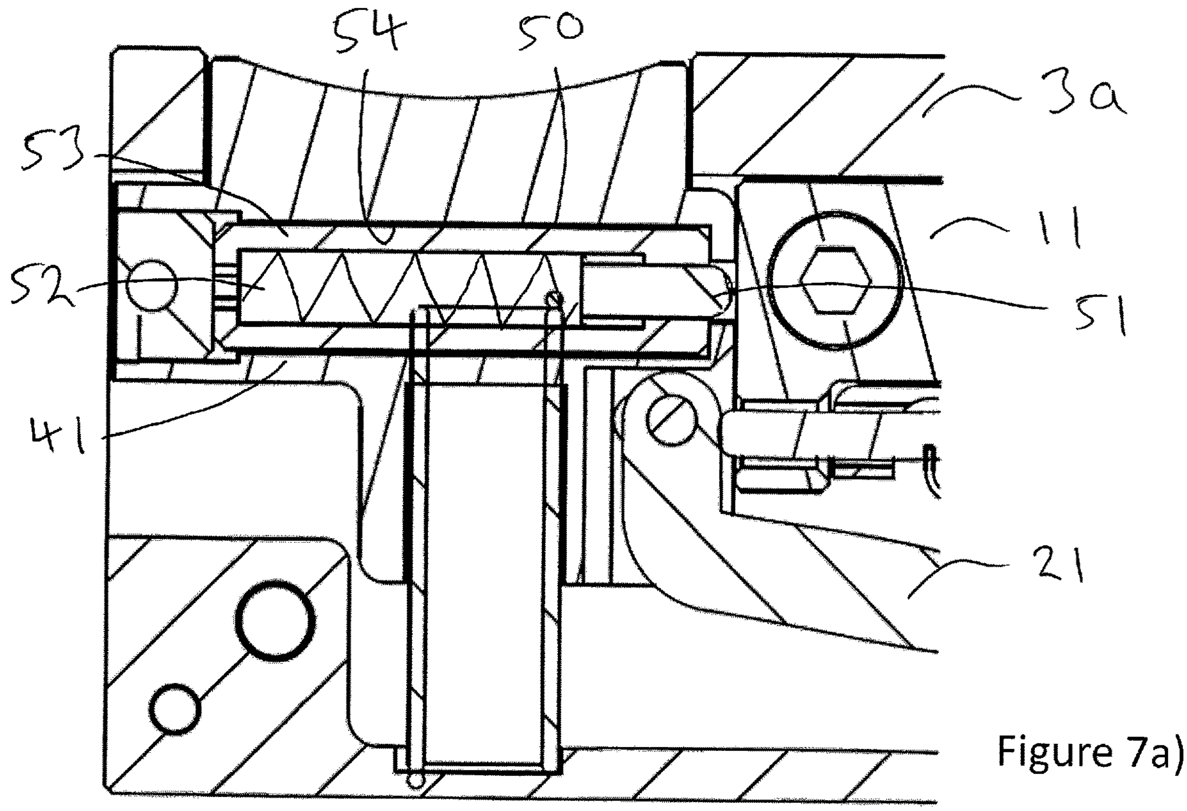
Figure 7B:
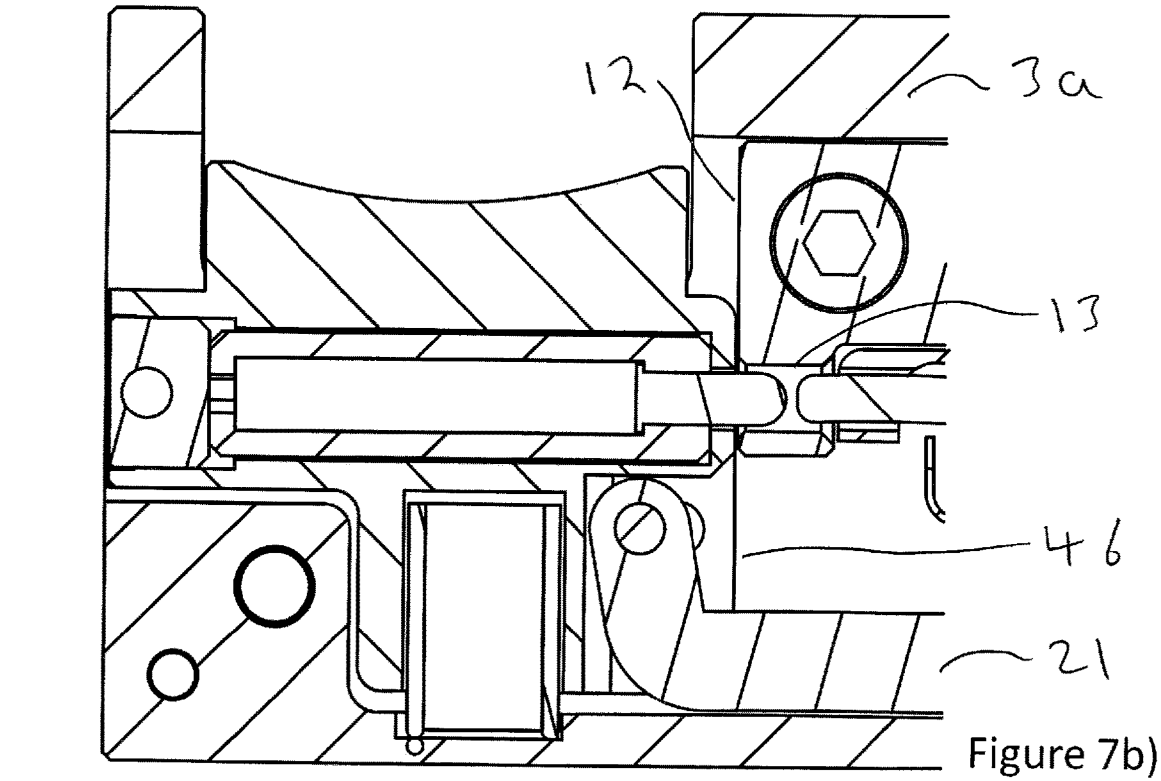

FIGS. 6*a-d* show the steps of loading a capillary into a capillary holder embodying the present invention;

FIGS. 7*a* and 7*b* show the steps of ejecting a capillary from the capillary holder in use.

Figure 8A:
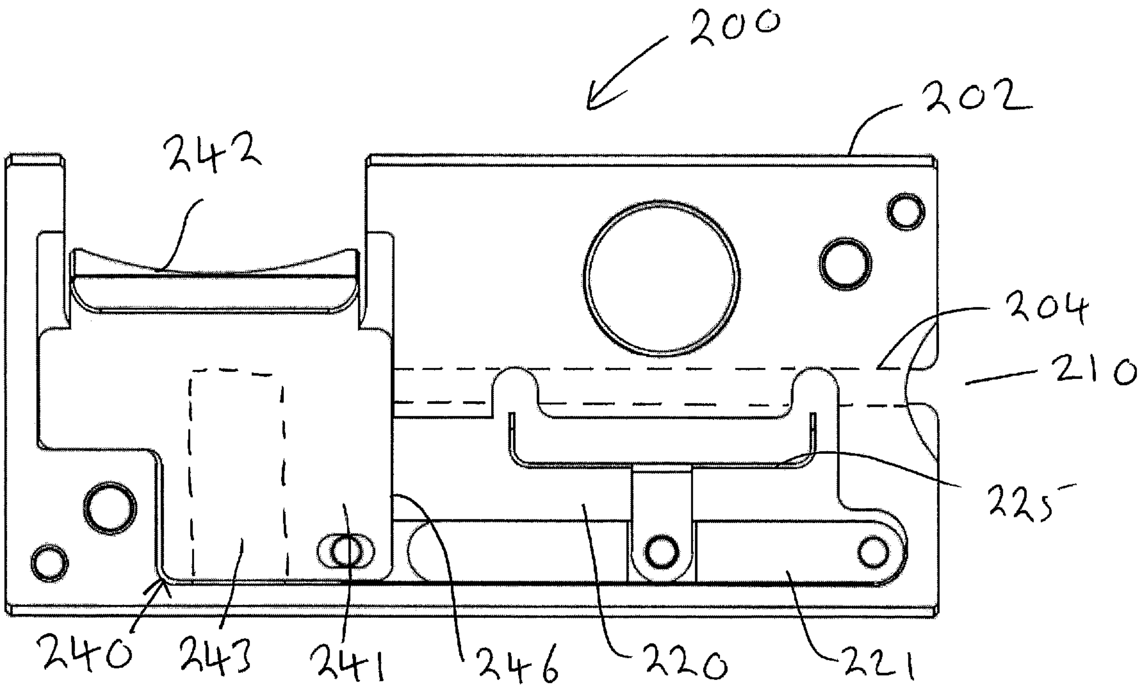
Figure 8B:
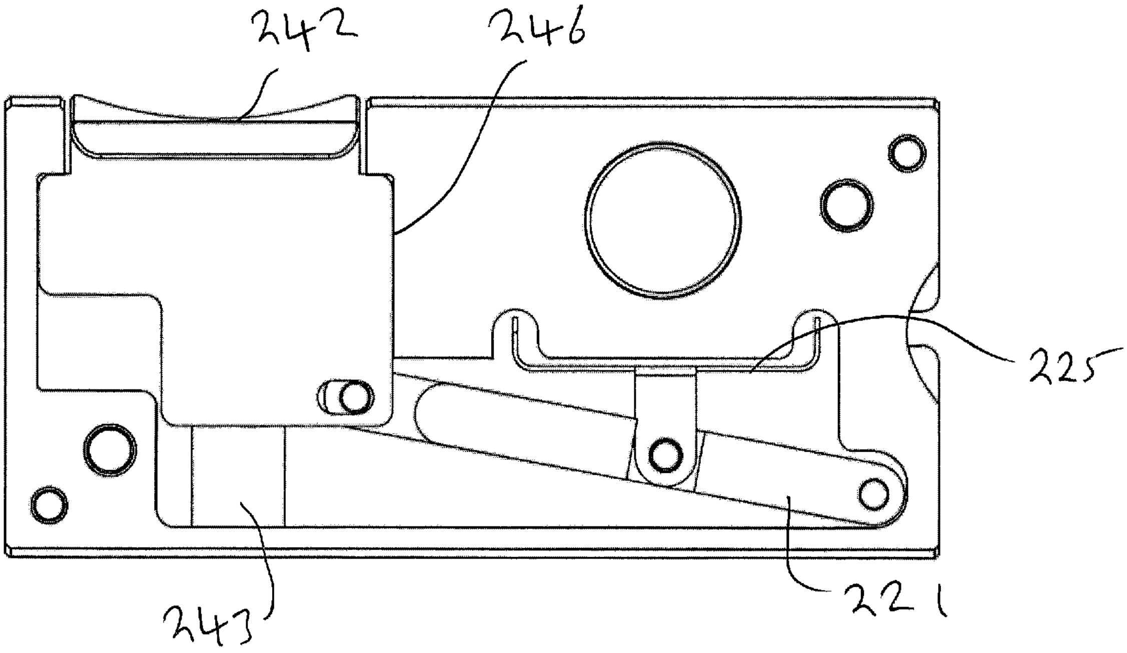
Figure 9:
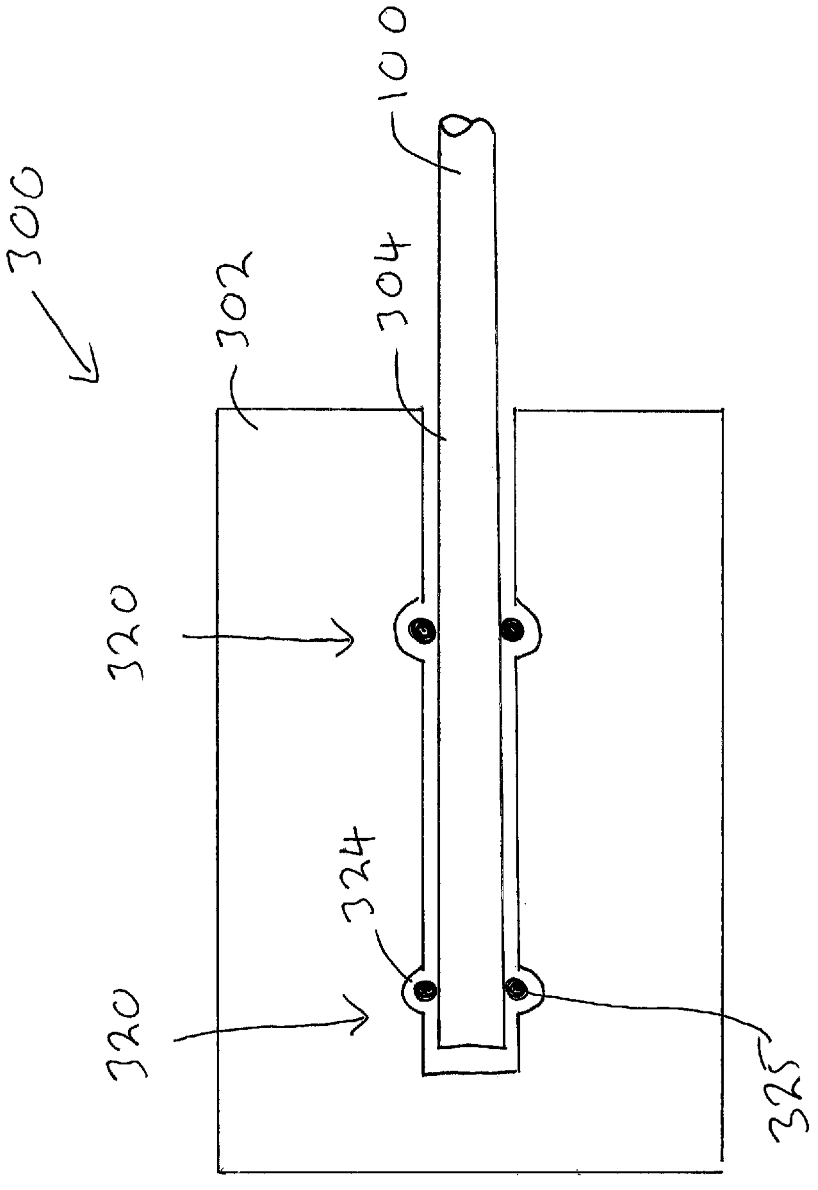

FIGS. 8*a* and 8*b* illustrate another holder for a capillary according to another arrangement disclosed herein;

FIG. 9 schematically illustrates another holder for a capillary according to another arrangement disclosed herein.

The figures illustrate a holder 1 for a capillary embodying the present invention.

The holder 1 comprises a housing 2 having a passage 4 to receive a capillary 100. In the embodiment shown, the housing 2 comprises two parts; a housing body 3*a* and a housing cover 3*b*. The passage 4 may be defined within the housing body 3*a*. In the embodiment shown, all of the primary components of the holder (the clamping mechanism 20, the trigger 50 and the release mechanism 40, to be described below) are arranged in the housing body 3*a*, although this is not essential. In one embodiment, not shown, a part of the passage 4 may be defined by a channel in the housing body 3*a*, and the other part of the passage 4 may be defined by a corresponding channel in the housing cover 3*b*, such that when the housing cover 3*b* is assembled on the housing body 3*a*, the passage 4 is formed by the two channels. The dimensions of the passage 4 may be configured to receive a capillary within a range of various diameters. In at least one embodiment, the diameter of the passage 4 is nevertheless small enough so as to prevent substantial misalignment of thinner capillaries in the passage, which could otherwise prevent the correct abutment of the capillary with the trigger.

Figure 1:
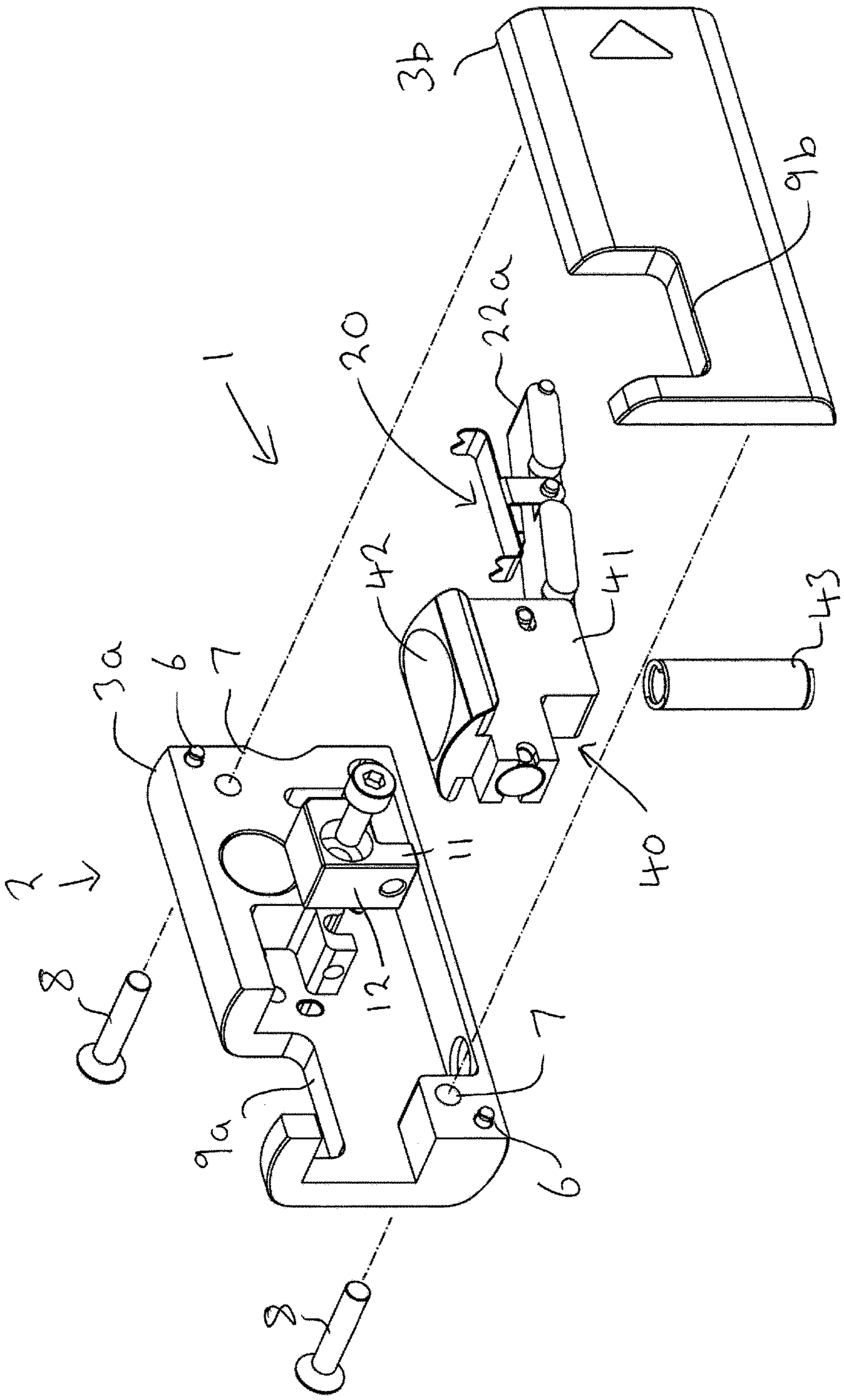
FIG. 1 shows an exploded view of a holder for a capillary embodying the present invention.
Figure 2:
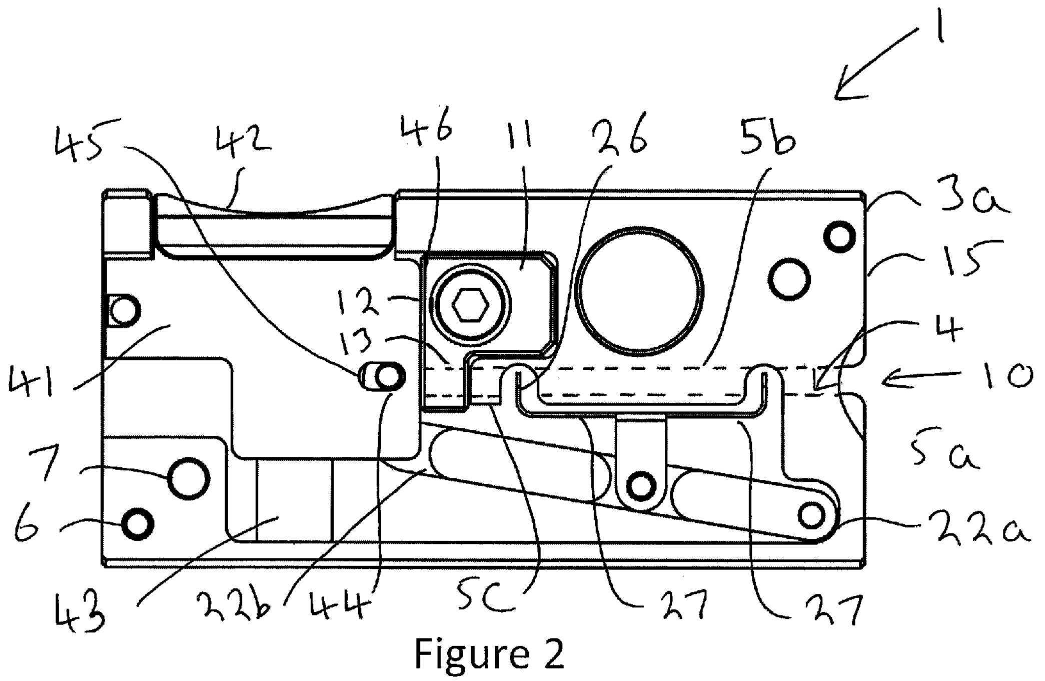
FIG. 2 shows the holder of FIG. 1, with a part of the housing removed.
Figure 3:
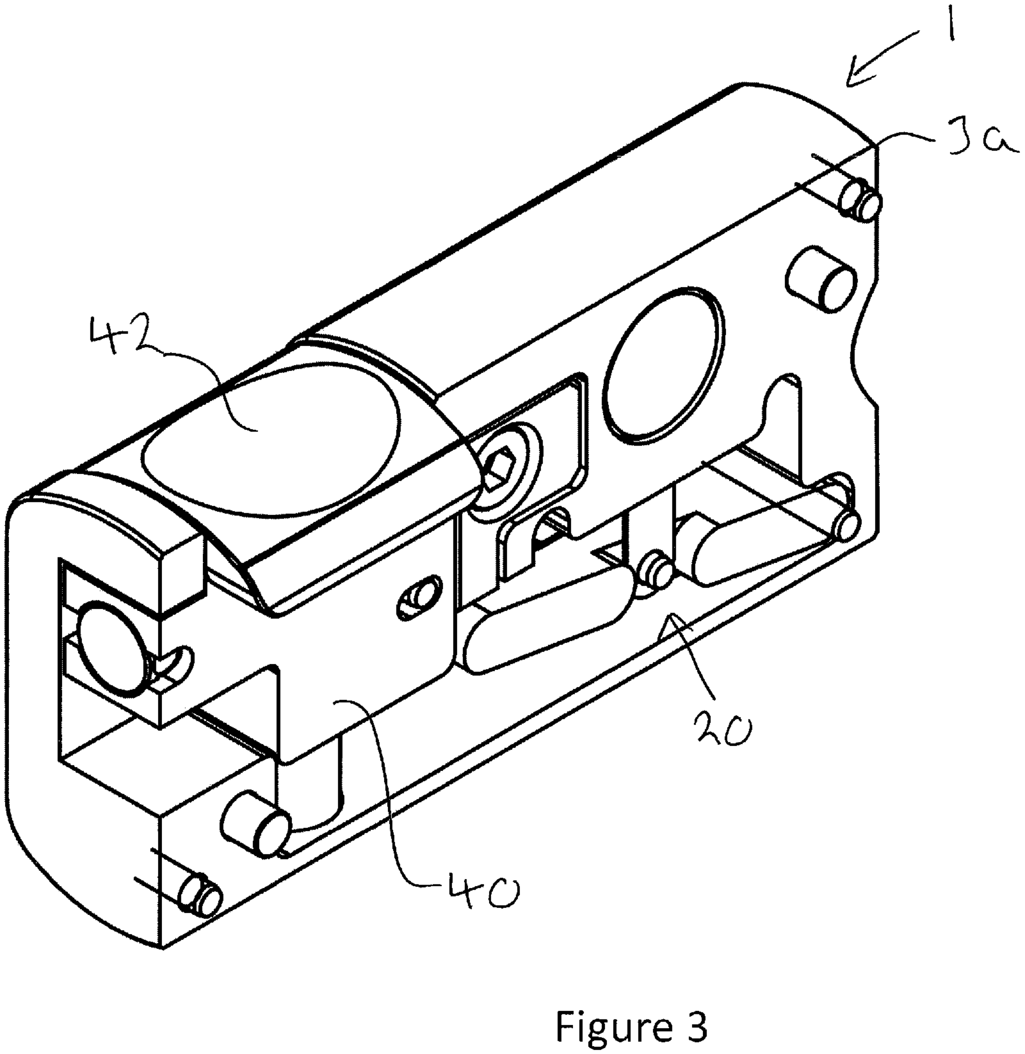
FIG. 3 shows the holder of FIG. 2, from a different angle.

In the embodiment shown, as best illustrated in FIG. 2, the passage 4 is defined by a series of axially aligned guide apertures 5*a*, 5*b*, 5*c* in the housing body 3*a*.

In the embodiment shown, the housing body 3*a* comprises two locating pins 6, which are receivable in two corresponding locating apertures on the housing cover 3*b* (not shown). Furthermore, the housing body 3*a* comprises two apertures 7 through which assembly screws 8 may be inserted and received in corresponding threaded apertures in the housing cover 3*b* (not shown) to hold the housing 2 together. The locating pins 6 ensure the correct assembly and alignment of the housing body 3*a* and the housing cover 3*b*.

Both the housing body 3*a* and housing cover 3*b* comprise a slot 9*a*, 9*b* which, when the housing 2 is assembled, provides access to a release mechanism 40, as described below.

The housing 2 (in the embodiment shown, the housing body 3*a*) comprises a port 10 on a front face 15 of the holder 1, to receive a capillary 100 into the passage 4.

The holder 1 further comprises a clamping mechanism 20. As will be described below, the clamping mechanism 20 is configurable between: an engaged state in which the clamping mechanism 20 is configured to retain a capillary 100 receivable in the passage 4 in use (see FIG. 2); and a disengaged state in which the clamping mechanism 20 is configured to allow insertion and/or removal of a capillary 100 in the passage 4 in use (see FIG. 6*a*).

The clamping mechanism 20 comprises a clamping arm 21 and a clamping element 25. A first end 22*a* of the clamping arm 21 is pivotably mounted to the housing 2. The clamping element 25 is mounted to the clamping arm 21 between the first 22*a* and second 22*b* ends of the clamping arm 21. The clamping element 25 may be pivotably mounted to the clamping arm 21. In at least one embodiment, the clamping element 25 comprises a capillary-engaging tooth 26 at each of the first and second ends of the clamping element 25. Each tooth 26 may comprise a detent, sized so as generally to correspond with the outer profile of a capillary 100. In use, when the teeth 26 of the clamping element 25 engage with a capillary 100, axial movement of the capillary 100 (along the passage 4) may be substantially prevented. The teeth 26 of the clamping element 25 may urge the capillary 100 against the surface of the passage 4, which creates sufficient friction to substantially prevent the removal of the capillary 100.

The detent of each tooth 26 may be 'v-shaped. In at least one embodiment, the tooth 26 is configured to substantially self-centre a capillary as it is clamped. This may allow for the holder to accompany capillaries of various diameters and/or cross-sections. In the embodiment shown the clamping element 25 comprises a leaf spring. The arms 27 of the leaf spring, extending from the middle of the leaf spring to each end thereof, are resilient. In use, when the clamping arm 21 is rotated (clockwise, in the direction shown in FIG. 2), the leaf spring may be caused to at least partially deform, which, in turn, increases the force applied by the teeth 26 onto the capillary 100.

The leaf spring may be configured such that it flexes and absorbs the increase in reaction force variations and thereby reduces the risk of damaging or breaking the capillary. The leaf spring may also be configured to cater for tolerance variations of the parts, compression spring force as well as the capillary diameter.

The leaf spring may be configured so as to ensure it provides a suitable capillary clamping force, while minimising any plastic deformation, over repeated actuations.

The provision of two teeth 26, spaced apart from one another, may promote the correct alignment of the capillary with respect to the passage 4.

In the embodiment shown, the teeth 26 of the clamping element 25 are arranged to be receivable in the spaces formed between the series of guide apertures 5*a*, 5*b*, 5*c*.

In at least one embodiment, if the clamping mechanism is in the engaged stage but there is no capillary in the passage, the teeth 26 may serve to block the insertion of a capillary into the passage until the clamping mechanism is reset to a disengaged stage.

The holder 1 further comprises a release mechanism 40 operatively associated with the clamping mechanism 20. The release mechanism 40 is configured to change the clamping mechanism 20 from the engaged state to the disengaged state by a user operating the release mechanism 40.

In the embodiment illustrated, the release mechanism 40 comprises a carriage 41 which is translatably received within the housing 2 and constrained to move between a first position (FIG. 2) and a second position (FIG. 6*a*). In the first position, a button portion 42 of the carriage 41 is substantially flush with the outside of the housing 2. In the first position, the clamping mechanism 20 is configured in the engaged state. In the second position of the carriage 41, the button portion 42 may be substantially flush with the bottom of the slot 9*a*, 9*b* in both the housing body 3*a* and housing cover 3*b*. In the second position of the release carriage 41, the clamping mechanism 20 is configured in the disengaged state.

The release mechanism 40 further comprises a spring 43 which is configured to bias the carriage 41 towards the first position. In at least one embodiment, the release mechanism 40 and/or housing 2 are configured such that at least one mechanical stop or other feature prevents the carriage 41 from escaping through the slot 9*a*, 9*b* in the housing 2. There may further be provided at least one alignment feature which ensures smooth linear translation of the carriage 41 within the housing 2.

The second end 22*b* of the clamping arm 21 is pivotably mounted to the carriage 41 of the release mechanism 40. In the embodiment shown, the pivoting connection is a floating connection, comprising a pin 44 riding in a slot 45. The pin 44 is provided at the second end 22*b* of the clamping arm 21 and rides in a slot 45 provided in the carriage 41. This is because the first end 22*a* of the clamping arm 21 is pivotably mounted to the housing 2, whereas the carriage 41 of the release mechanism 40 is constrained for linear motion. The floating pivoting connection is therefore necessary, in the embodiment shown, to ensure the smooth operation of the assembly. Nevertheless, the skilled person would appreciate that other arrangements are possible. For example, at least one end of the clamping arm 21 may telescope such that the second end 22*b* may be pivotably attached to the carriage 41 without a pin 44 and slot 45 arrangement. Alternatively, the carriage 41 may be mounted to allow an arcuate motion.

It will be appreciated that as the carriage 41 translates relative to the housing 2, the clamping arm 21 will rotate. In doing so, the clamping element 25 moves towards or away from the capillary 100.

In its natural state, the spring 43 of the release mechanism 40 urges the carriage 41 into the first position, such that the clamping mechanism 20 is configured in an engaged state to retain a capillary 100 receivable in the passage 4. To change the clamping mechanism 20 to a disengaged state, a user must apply a force to the release mechanism 40, for example by engaging their finger or thumb with the button portion 42, and overcoming the force provided by the spring 43. In doing so, the carriage 41 then translates towards the second position, causing the clamping mechanism 20 to change to a disengaged state.

In the embodiment shown, the spring 43 is associated with the carriage 41. It will be appreciated that the spring 43 may otherwise be associated with the clamping mechanism 20, for example by being arranged between the housing 2 and the clamping arm 21. Alternatively, a torsion spring may be associated with the pivoting connection of the first end 22*a* of the clamping arm 21 to the housing 2.

The holder 1 further comprises a trigger 50 operatively associated with the clamping mechanism 20, configured to change the clamping mechanism 20 from the disengaged state to the engaged state by inserting a capillary 100 into the passage 4.

In at least one embodiment, the trigger 50 is configured to change the clamping mechanism 20 from the disengaged state to the engaged state by engaging the capillary 100 with the trigger 50. In at least one embodiment, the trigger 50 is operated by engaging a proximal end 101 of the capillary 100 with the trigger 50.

Figure 4:
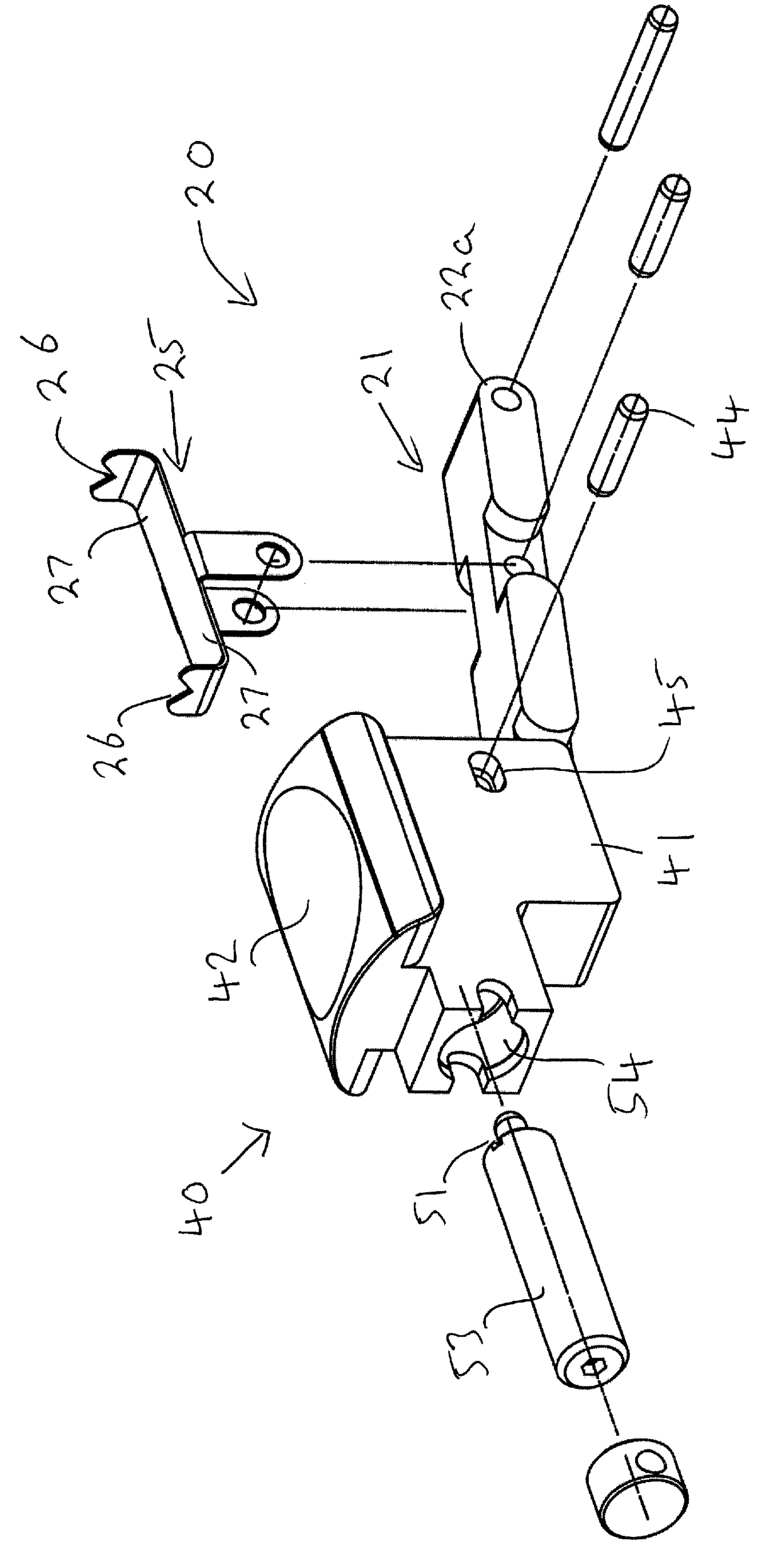
FIG. 4 shows an exploded view of a clamping mechanism and release mechanism assembly of a holder embodying the present invention.
Figure 5:
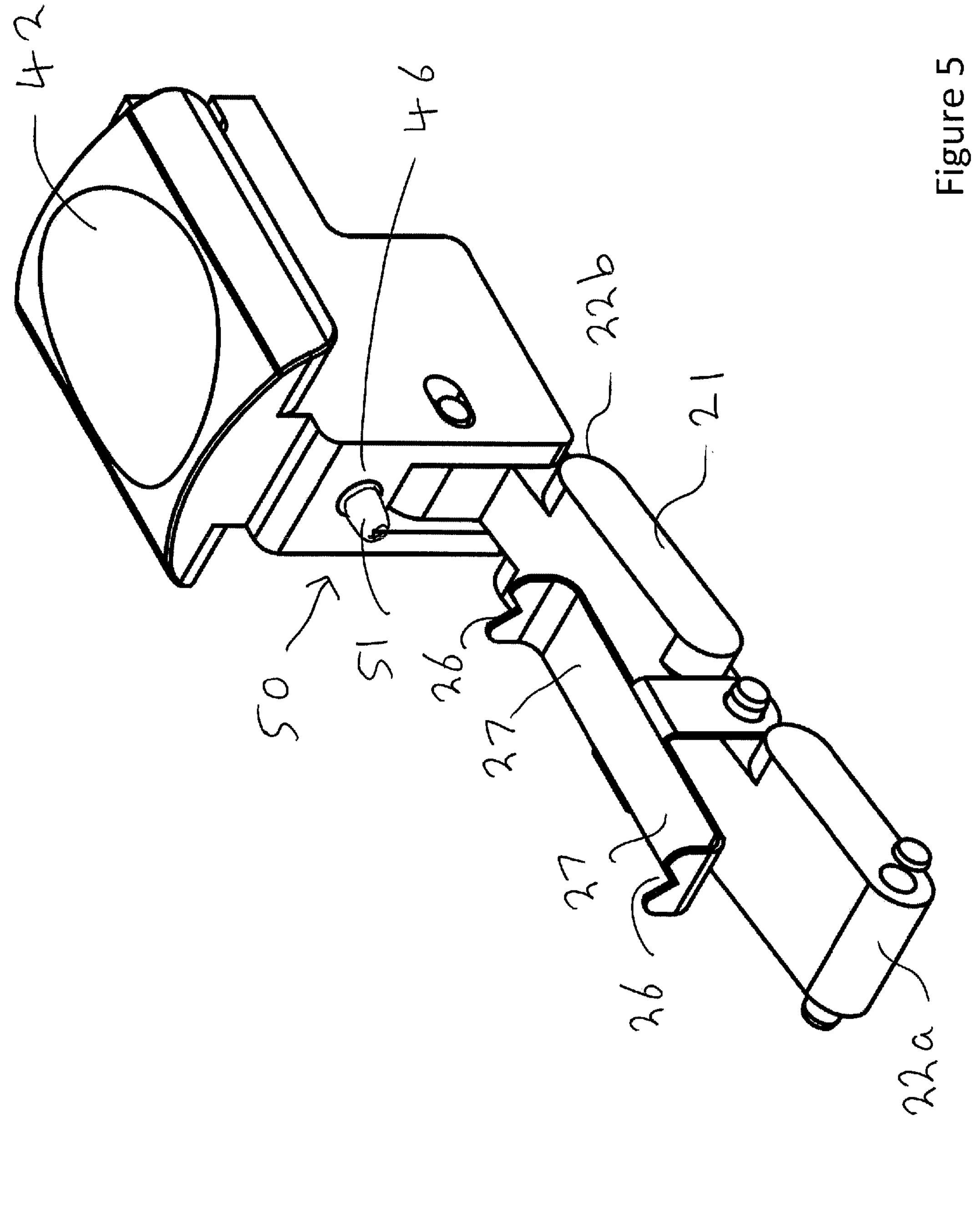
FIG. 5 shows the assembly of FIG. 4 from a different angle.
Figure 6:
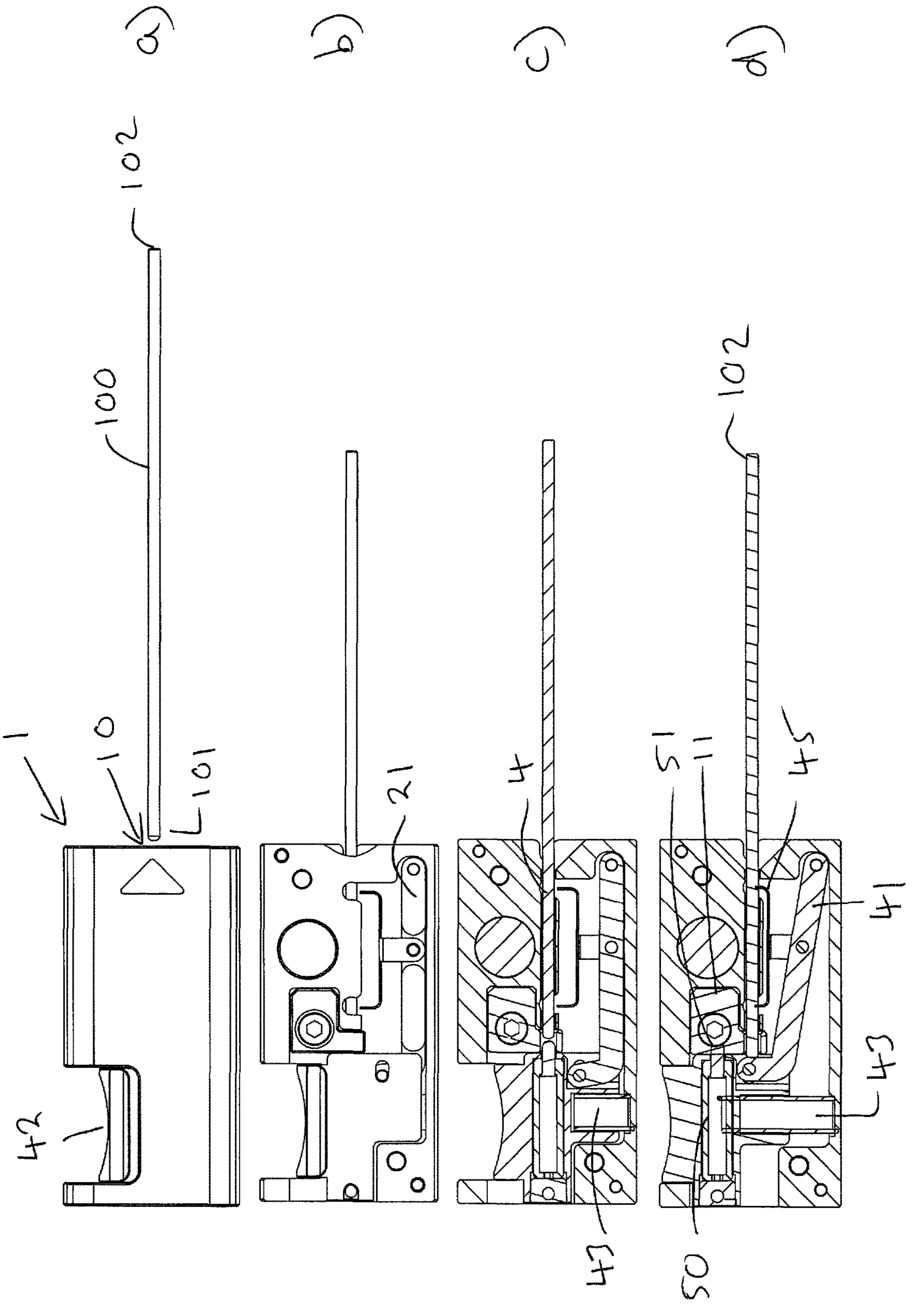

The trigger 50 comprises a plunger 51 arranged in the carriage 41 and biased to protrude from the front surface 46 of the carriage 41 by means of a plunger spring 52. The plunger 51 may be depressed so as to sit inside the carriage 41 when a force is applied to the plunger 51 which is greater than the biasing force of the plunger spring 52. In the embodiment shown, the plunger 51 comprises a cartridge 53 which is receivable in a plunger aperture 54 in the carriage 41. The cartridge 53 may be removable/adjustable from the rear face of the carriage 41, as shown in FIG. 4.

When the carriage 41 is in the first position, the plunger 51 is depressed in the carriage 41 so as to not protrude therefrom. When the carriage 41 is in the second position, the plunger 51 is urged by the plunger spring 52 to protrude from the carriage 41 and be received in the passage 4, as shown in FIG. 6*a*-6*c* and FIG. 7*b*. In at least one embodiment, the diameter of the plunger 41 is equal to or less than the diameter of the passage 4. The diameter of the plunger 51 may be the same as or different to the diameter of the capillary 100.

When the carriage 41 is translated by a user from the first position to the second position (against the force of the spring 43), the plunger 51 aligns with the passage 4 and the plunger spring 52 urges the plunger 51 into the passage 4. This serves to effectively hold the carriage 41 in the second position, such that it will remain in the second position even when the user removes the force from the release mechanism 40. This is shown in FIG. 6*a*. Effectively, the holder 1 is primed to receive a capillary 100.

A user may now load a capillary 100 into the holder 1, by inserting the capillary 100 into the port 10 and passing the capillary 100 through the passage 4 in the housing. See FIG. 6*b*. The port 10 may comprise a chamfer to aid alignment of the capillary during insertion.

As the capillary 100 travels through the passage 4, an end of the capillary 100 (i.e. the proximal end 101 opposite to the tip 102 used to retain a sample), will engage with the distal end of the plunger 51. See FIG. 6C. At this point, a user may apply additional force to the capillary 100, to overcome the spring force of the plunger spring 52. As they do so, the plunger 51 will begin to be pushed into the carriage 41. When the plunger 51 is pushed substantially fully into the carriage 41, it no longer protrudes into the passage 4 and thus no longer serves to lock the carriage 41 in the second position. At this point, the stored energy in the spring 43 of the release mechanism 40 causes the carriage 41 to travel to the first position, thereby changing the clamping mechanism 20 to the engaged state. The capillary 100 is then substantially retained in the passage 4 with the clamping mechanism 20, see FIG. 6*d*.

The spring force of the plunger spring 52 may be optimised to minimize the force needed to be applied by a user when inserting a capillary, to reduce the chances of the capillary breaking or being damaged. At the same time, the spring force may be high enough such that the spring force of the main spring 43 does not inadvertently force the plunger to be depressed even without contact with a capillary.

As illustrated in FIG. 2, the holder 1 may further comprise a bearing block 11 mounted in the housing 2. The bearing block 11 presents a bearing surface 12 which opposes the front surface 46 of the carriage 41. The bearing block 11 comprises a guide aperture 13 which is axially aligned with the guide apertures 5*a*, 5*b*, 5*c* of the housing body 3*a* to collectively define the passage 4. As illustrated in FIG. 7*b*), the plunger 51 is receivable in the bearing block guide aperture 13 in use.

The bearing block 11 may be formed of a friction-reducing and/or self-lubricating material, such as PEEK, Vespel or acetal. It will be appreciated from the description above that as the carriage 41 translates between the first and second positions, the plunger spring 52 continues to bias the plunger 51 outwardly. Consequently, the tip of the plunger 51 is biased into engagement with the bearing surface 12 of the bearing block 11. The provision of the bearing block 11 serves to reduce the friction that would otherwise be experienced if the plunger 51 was to be contacting and sliding along the surface of the housing body 3*a* (which may be metal).

The plunger may at least partially comprise stainless steel. Alternatively or additionally, the plunger, or at least the tip thereof, may be comprised of a friction-reducing material, such as Nylon or polyacetal.

In at least one embodiment, the extent to which the plunger protrudes from the front surface 46 of the carriage 41 is configured so as to mitigate against the effects of any tolerance stackup variations and friction variations in the capillary holder without significantly increasing the capillary insertion force.

The bearing block 11 may be removable and replaceable, when significant wear has occurred. The bearing block 11 determines the extent of inward translation of the plunger 51 that is required before the carriage 41 is released to travel from the second position to the first position. Therefore, the length of the portion of capillary 100 which is received in the holder 1 may be equal to the distance from the bearing surface 12 of the bearing block 11 to the front face 15 of the housing 2.

One benefit of this arrangement is that the trigger 50 causes the clamping mechanism 20 to change to an engaged state when the proximal end 101 of the capillary 100 is at a predefined position relative to the housing/passage. Therefore, the relative positioning of a capillary in the holder is repeatable for a plurality of capillaries. Consequently, the length of the portion of the capillary 100 which protrudes from the holder will be repeatable, for a given length of capillary 100. At least a part of the housing 2 of the holder 1 (for example the front surface 15) may therefore act as a datum point during the subsequent insertion of the capillary 100 into an ion source instrument. If a particular part of the holder 1 engages with a particular part of the instrument, this serves to ensure that the distal tip 102 of the capillary will be positioned in a precise location relative to the instrument.

The length of the capillary protruding from the holder may be configured such that it is long enough to allow a user to dip/swab the capillary into/with a sample. The length may be configured such that it is suitable to reach the bottom of most commercially available vials/sample bottles. The protruding length may be 70 mm.

A further benefit of the arrangement is that, at the point of the plunger 51 being depressed into the carriage 41, and/or the spring 43 of the release arrangement 40 causing the carriage 41 to move from the second position to the first position, an audible "click" may be created, which serves to confirm to a user that the capillary 100 has been correctly installed and retained in the holder 1. This motion may also create a vibration in the housing 2, providing a tactile feedback to the user that the capillary 100 is correctly loaded. In effect, the arrangement may be substantially 'fool proof', only securing a capillary in the holder if it is corrected inserted.

Once the capillary 100 is installed into and retained by the holder 1, the assembly may then be manually handled by the user as required.

To remove a capillary 100 from the holder 1, a user must actively engage the release mechanism 40. To do this, a user applies a force to the button portion 42 of the carriage 41, overcoming the force of the spring 43, so as to start to move the carriage 41 from the first position to the second position (see FIG. 7*a*). As the carriage 41 reaches the second position, the plunger 51 is substantially aligned with the passage 4. The energy in the plunger spring 52 is then released, causing the plunger 51 to protrude from the carriage 41 and into the passage 4 (see FIG. 7*b*).

The holder may be used one-handed. The holder may be substantially symmetrical about one plane, allowing both left and right-hand use.

In at least one embodiment, the release of the stored energy in the plunger spring 52 is relatively rapid, which serves to engage the proximal tip 101 of the capillary 100. In at least one embodiment, the stored force in the plunger spring 52 is such that the capillary 100 is caused to be ejected from the passage 4. In at least one embodiment, the energy stored in the plunger spring 52 is sufficient to cause the capillary 100 to be entirely ejected free of the holder 1. Conveniently, this allows a user to eject the capillary 100 from the holder 1 into a waste receptacle without the user having to touch the capillary 100, which may carry a harmful substance and/or be hot.

In an embodiment which does not provide an ejection force, removal of the capillary from the holder may be effected by simply tipping the holder up, and relying on gravity.

In the embodiments described, the trigger comprises a plunger which is arranged co-axially with the capillary. In another embodiment, the trigger may take other forms. The trigger may comprise a cam member protruding into the passage, which is contacted by the capillary as it is passes through the passage. Movement of the cam member may, in turn, activate the plunger or another trigger mechanism. Alternatively, a plunger may be provided which translates transversely to the direction of the travel of the capillary.

FIGS. 8*a* and 8*b* illustrate an alternative holder 200 for a capillary, comprising: a housing 200 having a passage 204 to receive a capillary 100; and a clamping mechanism 220 configurable between: an engaged state in which the clamping mechanism 220 is configured to retain a capillary 100 receivable in the passage 204 in use; and a disengaged state in which the clamping mechanism 220 is configured to allow insertion/removal of a capillary 100 in the passage 204 in use; and a release mechanism 240 operatively associated with the clamping mechanism 220 and movable between a first position, in which the clamping mechanism 220 is configured in said engaged state; and a second position, in which the clamping mechanism 220 is configured in said disengaged state, wherein the release mechanism 240 is configured to bias the clamping mechanism 220 towards the engaged state, wherein the passage 204 in the housing 202 comprises an end stop, configured to abut the end of a capillary 100 inserted in the passage in use.

It will be noted that the holder 200 illustrated in FIGS. 8*a* and 8*b* is substantially similar to the holder 1 shown in FIGS. 1 to 7. Accordingly, similar features are indicated using similar reference numbers.

The holder 200 in FIGS. 8*a* and 8*b* comprises a housing 202 having a passage 204 to receive a capillary 100. The housing 202 may comprise two parts, such as a body and housing cover, as with the holder 1 shown in FIGS. 1 to 7.

The holder 200 comprises a clamping mechanism 220 having substantially the same features as the clamping mechanism 20 illustrated in FIGS. 1 to 7. Accordingly, the clamping mechanism 220 may comprise a clamping arm 221 and a clamping element 225.

The holder 200 further comprises a release mechanism 240. The release mechanism 240 is operatively associated with the clamping mechanism 220 and moveable between a first position, in which the clamping mechanism 220 is configured in an engaged state (such as shown in FIG. 8*b*); and a second position, in which the clamping mechanism 220 is configured in a disengaged state (as shown in FIG. 8*a*).

The release mechanism 240 further comprises a spring 243 which is configured to bias the release mechanism 240 into the first position.

As with the release mechanism 40 shown in FIGS. 1 to 7, the release mechanism 240 of the holder 200 of FIGS. 8*a* and 8*b* comprises a carriage 241. The carriage 241 is substantially the same as the carriage 41 shown in FIGS. 1 to 7, but does not further comprise the trigger arrangement.

The carriage 241 comprises a substantially planar front surface 246. The surface 246 acts as an end stop, at the end of the passage 204. The surface 246 is substantially perpendicular to the longitudinal axis of the passage 204. As will be seen in FIGS. 8*a* and 8*b*, the surface 246 presents an end stop at the end of the passage 204 regardless of which configuration the clamping mechanism 220 is in. This conveniently provides a datum point, defining the end of the passage 204. Accordingly, when a user inserts a capillary 100 into the passage 204, assuming that the capillary 100 is of a known length, a predetermined length of the capillary 100 will be received inside the passage 204, and a predetermined length of the capillary 100 will extend from the holder 200.

Since the release mechanism 240 is configured to bias the clamping mechanism 220 towards the engaged state, in order to load the holder 200 with a capillary 100, a user must first apply a manual force to the button portion 242, to overcome the spring force of the spring 243. When the button portion 242 is fully depressed, as shown in FIG. 8*a*, and the release mechanism is in the second position, a user is able to insert a capillary into the passage 204 until the end of the capillary 100 abuts the surface 246 of the carriage 241. At this point, the user may then remove or reduce the manual force applied to the button portion 242. When the force from the spring 243 is greater than the manual force being applied in the opposite direction by the user on the button portion 242, the carriage 241 translates towards the first position. As it does so, the clamping mechanism 220 engages with the capillary 100 and retains it in the passage 204.

FIG. 9 shows another holder 300 according to an alternative arrangement. The holder 300 comprises a housing 302 having a passage 304 to receive a capillary 100. The aperture 304 comprises a blind aperture, such that a predetermined portion of a capillary 100 may be received in the aperture 304 before it abuts the end of the aperture 304.

The holder 300 further comprises a clamping mechanism 320. In the embodiment shown, the clamping mechanism 320 comprises two toroidal recesses 324, adjacent the passage 304. Two O-rings 325 may be received in the recesses 324. The inner diameter of the O-rings 325 may be less than the outer diameter of the capillary 100 to be received therein.

As a capillary 100 is received into the passage 304, it passes through the inner diameter of the O rings 325 which causes them to deform. The O rings 325 are effectively captured within the recesses 324, so are not easily removable. As a capillary 100 is inserted further into the aperture 304, it will pass through both O rings 325 until the distal end of the capillary 100 abuts the end of the passage 304. The O-rings 325 serve to retain the capillary 100 in the aperture 304, requiring a manual force above a predetermined level in order to remove the capillary 100 from the passage 304.

The holder 300 provides a convenient arrangement to retain a capillary 100 in a holder 300, such that a predetermined length of the capillary protrudes from the holder 300.

Although two O-rings 325 and apertures 324 are illustrated, other arrangements are of course possible. There may be one, or three or more O-rings 325. Other means of gripping the capillary 100 in the passage 304 are envisaged.

Representative features are set out in the following clauses, which stand alone or may be combined, in any combination, with one or more features disclosed in the text and/or drawings of the specification.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A holder for a capillary, comprising:
a housing having a passage to receive a capillary;
a clamping mechanism configurable between:
an engaged state in which the clamping mechanism is configured to retain a capillary receivable in the passage in use; and
a disengaged state in which the clamping mechanism is configured to allow insertion/removal of a capillary in the passage in use; and
a trigger operatively associated with the clamping mechanism, configured to change the clamping mechanism from said disengaged state to said engaged state by inserting a capillary into the passage.

2. A holder according to claim 1, wherein the trigger is configured to change the clamping mechanism from said disengaged state to said engaged state by engaging the capillary with the trigger.

3. A holder according to claim 1, further comprising a release mechanism operatively associated with the clamping mechanism, configured to change the clamping mechanism from said engaged state to said disengaged state upon a user operating the release mechanism.

4. A holder according to claim 3, configured to eject a capillary retained in the passage as the release mechanism changes the clamping mechanism to said disengaged state.

5. A holder according to claim 3, wherein the release mechanism is movable between a first position, in which the clamping mechanism is configured in said engaged state;

and a second position, in which the clamping mechanism is configured in said disengaged state.

6. A holder according to claim 5, wherein the release mechanism is biased towards the first position.

7. A holder according to claim 5, wherein the release mechanism comprises a carriage translatably received in the housing, the trigger comprises a plunger arranged in the carriage and configured to protrude from the carriage and be received in the passage when the carriage is in the second position, and be retained in the carriage when the carriage is in the first position.

8. A holder according to claim 7, wherein the plunger is biased to protrude from the carriage.

9. A holder according to claim 3, wherein the clamping mechanism comprises:

a clamping arm, pivotably mounted at a first end to the housing and pivotably mounted at a second end to the release mechanism; and a clamping element mounted to the clamping arm between the first and second ends.

10. A holder according to claim 9, wherein the clamping element is pivotably mounted to the clamping arm.

11. A holder according to claim 9, wherein the clamping element comprises a capillary-engaging tooth at each of the first and second ends of the clamping element.

12. A holder according to claim 9, wherein the clamping element comprises a leaf spring.

13. A holder according to claim 1, wherein the passage is at least partially defined by a bore of the housing.

14. A holder according to claim 1, further comprising a capillary, wherein the clamping mechanism is configured in said engaged state such that at least a portion of the capillary is substantially retained in the passage.

* * * * *